No. 608,959. Patented Aug. 9, 1898.
A. FLESHER & J. L. CRISLER.
GATE.
(Application filed Mar. 14, 1898.)

(No Model.) 2 Sheets—Sheet 1.

Witnesses
C. W. Waeker.
H. D. Amich.

Inventors
Joseph L. Crisler
Albert Flesher
by V. D. Shackbridge
Attorney

THE NORRIS PETERS CO., PHOTO-LITHO., WASHINGTON, D. C.

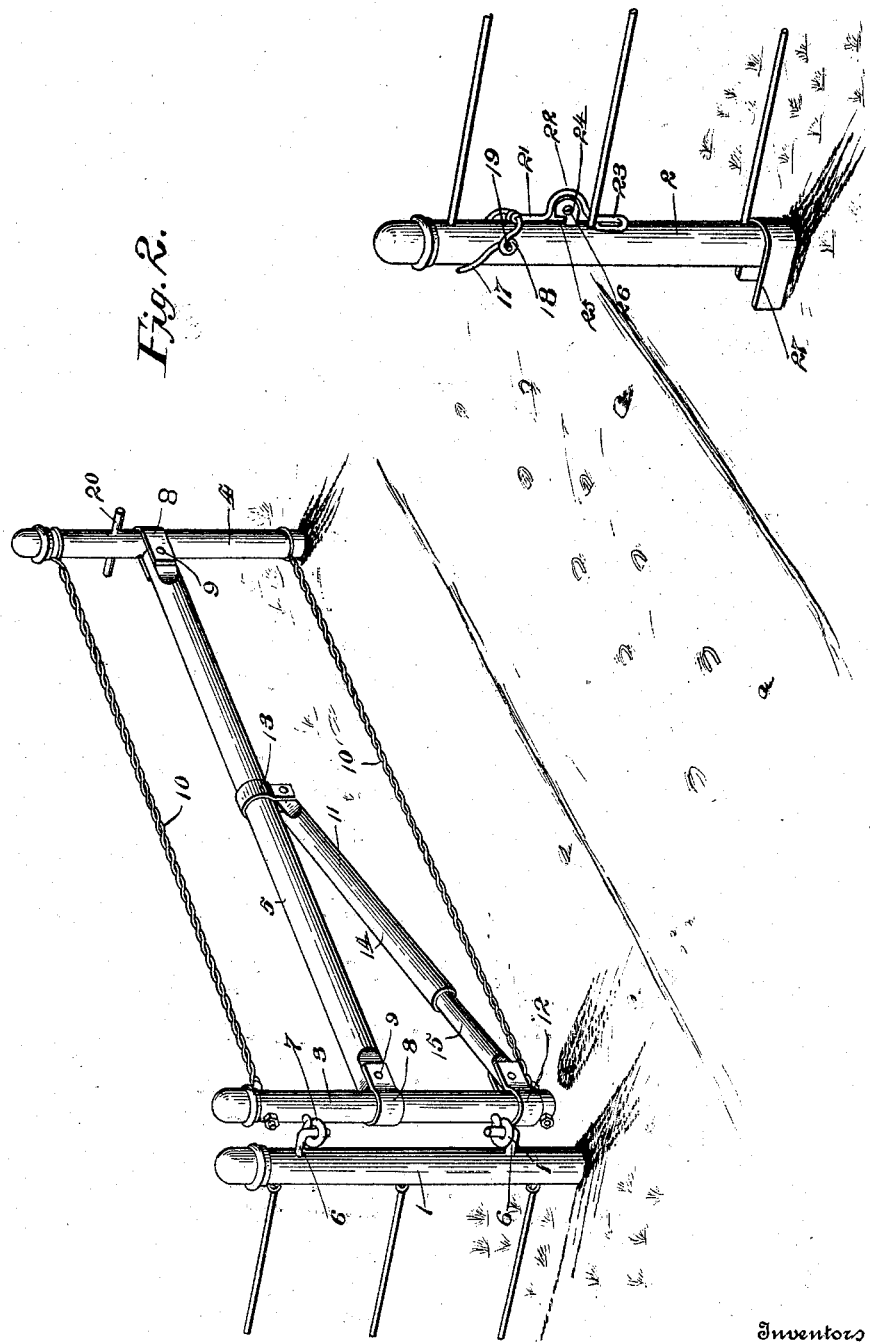

UNITED STATES PATENT OFFICE.

ALBERT FLESHER AND JOSEPH L. CRISLER, OF ALERT, OKLAHOMA TERRITORY.

GATE.

SPECIFICATION forming part of Letters Patent No. 608,959, dated August 9, 1898.

Application filed March 14, 1898. Serial No. 673,844. (No model.)

*To all whom it may concern:*

Be it known that we, ALBERT FLESHER and JOSEPH L. CRISLER, citizens of the United States, residing at Alert, in the county of Kay and Territory of Oklahoma, have invented certain new and useful Improvements in Gates; and we do hereby declare the following to be a full, clear, and exact description of the invention, such as will enable others skilled in the art to which it appertains to make and use the same.

The invention relates to an improvement in gates, the object being to provide a gate which when unlatched will automatically lift its swinging end clear of the keeper and also of obstructions on the ground and which is adapted to hold itself in any position to which it may be adjusted on the ground.

The construction by which the foregoing objects are attained will be best understood from the following description and claims, reference being had to the accompanying drawings, in which—

Figure 1:
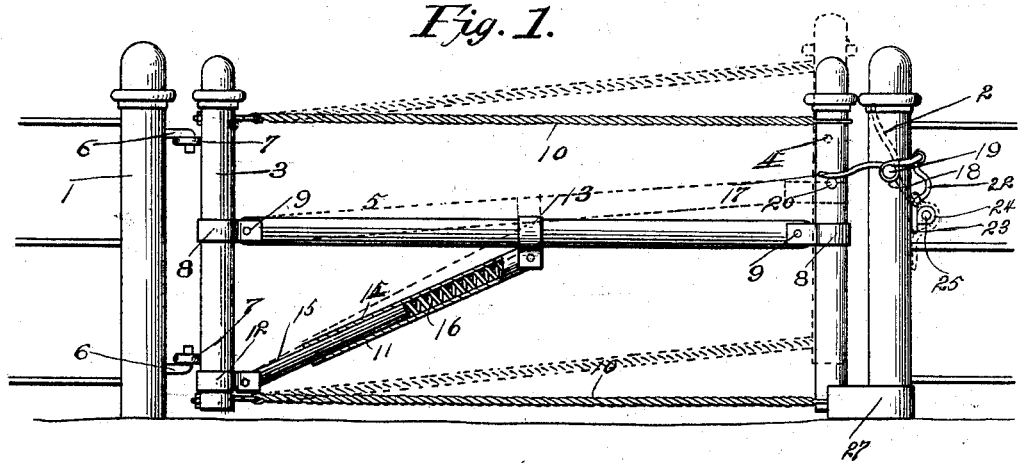
Figure 3:
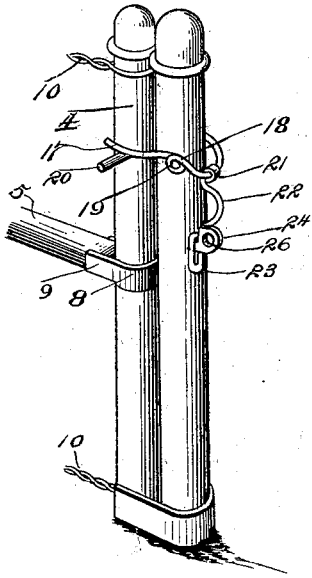
Figure 4:
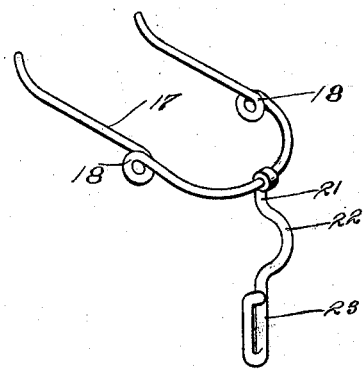

Figure 1 represents the improved gate in side elevation and partly in section to show the construction of the extensible brace. Fig. 2 is a perspective view showing the gate open and resting upon the ground. Fig. 3 is a detail perspective view of the swinging end of the gate and the post with which it connects, and Fig. 4 is an enlarged detail view of the gate-latch and hasp.

1 and 2 indicate the gate-posts, and 3 and 4 the end uprights.

5 indicates the longitudinal bar connecting the gate-uprights. The post 1 is provided with angle-irons or bolts 6, rigidly connected with said post and provided at their ends adjacent to the upright 3 with vertical arms, forming the hinge-pintles, preferably arranged to turn in opposite directions, the lower one being turned upward and the upper one downward, for a purpose which will appear.

7 indicates eyes on the upright 3, engaging the pintles of the angle-irons 6. The longitudinal bar 5 is arranged centrally of the length of the uprights 3 and 4 and is connected with said uprights by means of clips 8, the ends of said bar passing between ears on said clips and being pivoted thereto, as indicated at 9. The clips 8 may be formed integral with the uprights or may be rigidly secured thereto in any suitable manner.

10 10 indicate stout wires connecting the end uprights of the gate at top and bottom, the upright 3 being connected therewith by means of eyebolts, which permit the adjustment of the tension of the wires in a manner which will be readily understood. Any number of these wires may be employed both above and below the central bar 5, and they may be connected not only with the hinged end upright by eyebolts to permit of their adjustment, but may also be connected with the swinging end upright in a similar manner, if desired. Ordinarily eyebolts at the hinged end will be sufficient for giving proper tension to the wires.

11 indicates an extensible brace pivotally connected at one end with the end upright 3 by means of a clip 12 and at its opposite end with the horizontal bar 5 by means of a similar clip 13, rigidly secured to said bar at or near the center of its length. The brace 11 is composed of two parts, preferably of the tubular portion 14 and the plunger-rod 15, sliding within the tubular portion.

16 indicates a spiral spring interposed in the tubular portion between its outer end and the end of the plunger-rod 15, the arrangement being such that the tension of the spring is exerted to lift the swinging end of the gate whenever the gate is freed from its retaining-latch.

The latch indicated at 17 is made, preferably, from a single piece of stout wire bent into U shape and provided on each of its arms with a coil forming an eye 18, through which it is pivoted by means of a headed or angular through-bolt 19 to the post 2, near the upper end of the latter. The arms of the latch are shown as striding the post 2, and also the upright of the swinging end of the gate, for preventing movement of the latter in either direction, and when the gate is closed are made to rest on the ends of a through-pins or projections 20. The loop end of the latch has connected with it by means of an eye formed on its upper end a pivoted hasp 21, formed of stout wire and bent outward intermediate its ends at 22 to adapt it to swing free of the keeper 24, and is provided at its lower end with a loop 23, adapted to engage the keeper for holding the latch in its normal position with the gate-post. The keeper is provided with a notch 25 on its upper face adjacent to the post, into which the upper portion of the loop 23 drops by gravity when the latch is in its normal position, thereby preventing the accidental displacement of the latch. The keeper at its outer expanded end is provided with an eye or perforation 26, adapting it to receive a padlock for locking the gate when desired, and thereby preventing said gate from being opened.

27 indicates a U-shaped keeper applied to the post 2 at or near its lower end, between the arms of which the lower end of the upright 4 drops when the gate is closed.

By the construction described the gate when in its closed position is held against upward movement by means of the latch; but when the latch is released the tension of the spring 16 acts instantly to lift the swinging end of the gate free of the keeper 27, thereby adapting it to pass over obstructions of snow, ice, &c., and the gate can be swung in either direction, and when carried to the desired point by forcing it downward below the horizontal the tension of the wires is such as to hold the swinging end engaged with the ground in any position to which the gate may be adjusted. When, however, the gate is raised to a horizontal position, the tension of the spring again comes into play to lift the gate above the horizontal position, when it is adapted to be swung into its closed position in a manner which will be readily understood, after which by depressing the gate and engaging the latch therewith it will be held securely against accidental movement.

The gate constructed as above described is designed particularly for use in connection with wire fences; but it is apparent that it may be applied to fences of other constructions and will operate in connection with such fences in the manner described.

By the arrangement of the pintles of the gate in the manner described the removal of the hinge end of the gate from the pintles when the gate is locked is effectually guarded against.

When the hasp is released from the keeper, the weight thereof serves to depress the loop end of the latch, thereby throwing the arms of the latch up into substantially vertical position, leaving the gate free to be swung in either direction, as explained.

The gate-post, the end uprights, and also the bar of the gate are preferably formed of tubular metal—as, for instance, gas-pipe—but they may be formed of any suitable material, and the gate-posts are secured in the ground in any usual and desirable manner.

Having thus described the invention, what we claim as new, and desire to secure by Letters Patent, is—

1. The combination in a gate with the end uprights thereof, of the longitudinal bar pivotally connected with said end uprights, and the extensible thrust-brace interposed between the pivoted upright and the longitudinal bar.

2. The combination with the end uprights of the gate, of the longitudinal bar pivoted to said uprights, the divided and extensible brace connecting the hinged upright with said longitudinal bar, and the spring interposed between the parts of said extensible brace, substantially as described.

3. The combination with the end uprights of the gate, of the horizontal bar pivotally connected with said uprights, the extensible obliquely-arranged brace pivoted at its lower end to the lower end of the hinged gate-upright, and at its outer and upper end to the longitudinal bar at or near the center of the length of the latter, said brace consisting of a tubular portion, a plunger-rod operating in said tubular portion, and a spring contained in said tubular portion and against which said plunger abuts, for the purpose and substantially as described.

4. The combination in a gate with the end uprights thereof, of the longitudinal bar pivotally connected with said uprights, the obliquely-arranged extensible brace connected at one end to the lower end of the hinged upright and at its outer end with the longitudinal gate-bar, wires connecting said uprights above and below said longitudinal bar, and means for adjusting the tension of said wires, substantially as described.

In testimony whereof we affix our signatures in presence of two witnesses.

ALBERT FLESHER.
JOSEPH L. CRISLER.

Witnesses for Albert Flesher:
J. L. YARNELL,
W. F. LONG.

Witnesses for Jos. L. Crisler:
A. M. SMITH,
WM. L. FORD.